United States Patent [19]

Vogel et al.

[11] Patent Number: 4,490,988
[45] Date of Patent: Jan. 1, 1985

[54] DEGRADATION SENSING AND SHUT-DOWN MEANS FOR REFRIGERATION MOTOR-COMPRESSOR UNITS

[75] Inventors: Richard E. Vogel, Cincinnati; Benjamin Bowsky, Maineville, both of Ohio

[73] Assignee: Emerson Electric Co., St. Louis, Mo.

[21] Appl. No.: 499,321

[22] Filed: May 31, 1983

[51] Int. Cl.³ .............................................. F25B 31/00
[52] U.S. Cl. ...................................... 62/193; 340/631; 361/104
[58] Field of Search ................ 62/192, 193, 468, 475, 62/84; 184/6.4, 108; 123/196 S; 340/604, 631; 361/104, 178; 307/118

[56] References Cited

U.S. PATENT DOCUMENTS

| | | |
|---|---|---|
| 2,552,088 | 5/1951 | Davis . |
| 3,959,980 | 6/1976 | Hamilton .............................. 62/126 |
| 3,959,984 | 6/1976 | Vlasak .............................. 361/104 X |

Primary Examiner—William E. Wayner
Assistant Examiner—John Sollecito
Attorney, Agent, or Firm—Charles E. Markham

[57] ABSTRACT

Means for shutting down operation of an enclosed motor compressor unit for air conditioning and heat pump service consists in immersing a pair of spaced electrodes having a potential gradient thereacross in the refrigerant-oil mixture in the unit enclosure and in employing the ion and electron flow across the electrodes resulting from contaminants in the mixture to break the motor energizing circuit through relay means, and in the provision of a normally open fusible switch responsive to close in response to a predetermined high motor temperature and through relay means break the motor energizing circuit. In a simplified modification, the immersed electrodes are directly connected across the power supply leads and cause a fusible link connected in the power supply leads to open and break the motor energizing circuit when sufficient conduction across the electrodes occurs.

2 Claims, 9 Drawing Figures

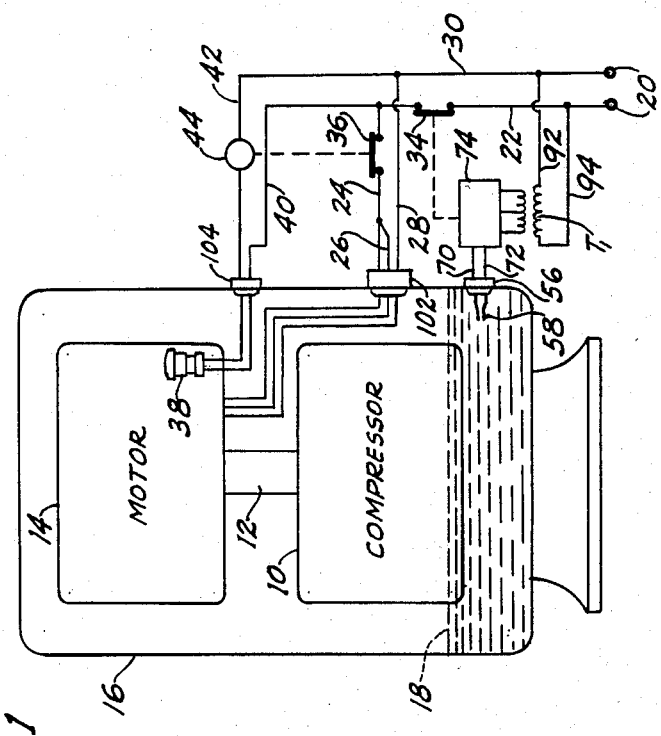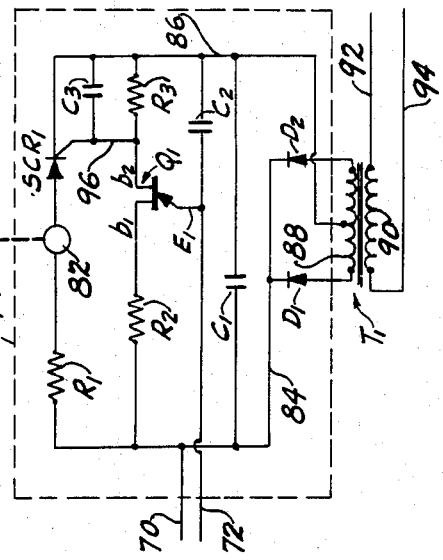

DEGRADATION SENSING AND SHUT-DOWN MEANS FOR REFRIGERATION MOTOR-COMPRESSOR UNITS

BACKGROUND OF THE INVENTION

Contamination of the refrigerant-lubricating oil mixture which accumulates in the lower part or sumps of the encasements of hermetically sealed or semi-sealed motor-compressor units employed in air conditioning or heat pump service increases with the length of service. This contamination consists for the most part of electrically conductive particles such as metal chips or carbon particles and may include semi-conductive particles and charged ions from lubricant and refrigerant breakdown. When contamination reaches a sufficient level or degree it causes malfunctioning of the compressor, clogging of refrigerant lines and the undue loading and overheating of the driving motor to the extent that a hazardous condition may result. Motor manufacturers usually provide recycling overtemperature switches of the bimetal type installed in the motor stator to provide temporary shut-down of the motor until it cools sufficiently.

But such recycling switches merely prolong a hazardous condition because usually in most instances the operation of the unit is infrequently monitored. When degradation of the unit as reflected in contamination of the refrigerant-oil mixture reaches a level indicative of a hazardous condition or indicative that the unit is nearing the end of its useful life a continued shut-down of the unit is essential. On the other hand an undesirable level of contamination of the refrigerant-oil mixture may occur early in the service of the unit or at least substantially before the end of its useful life. In such instances and wherein the encasement of the unit is such that it is practical to replace the contaminated refrigerant-oil mixture, a more discriminating means for determining a lesser level of contamination and effecting in response thereto a continued shut-down of the unit is desirable.

OBJECTS OF THE INVENTION

It is an object of this invention to provide a generally new and improved means for effecting the continued shut-down of operation of a motor-compressor unit in response to a predetermined level of contamination of the refrigerant-oil mixture.

It is a further object to provide generally new and improved means for effecting the continued shut-down of operation of a motor-compressor unit in response to a predetermined high temperature of the motor.

It is a further object to provide means for effecting the continued shut-down of a motor-compressor unit in response to a predetermined level of contamination of the refrigerant-oil mixture or in response to a predetermined high temperature of the motor whichever occurs first.

A further object is to provide a normally open encapsulated fusible switch positioned in the stator of the motor of a motor-compressor unit responsive to a predetermined high motor temperature to close and effect a continued shut-down of the unit.

A further object is to provide a pair of spaced electrodes immersed in the refrigerant-oil mixture and to impress a D C voltage across them, to provide means for accumulating and amplifying conduction occurring across the electrodes due to contaminants therebetween and to gate a unidirectional solid-state switch thereby to energize a relay operative when energized to break the energizing circuit for the motor and thereby effect a continued shut-down of the motor-compressor unit when accumulated voltage drop across the electrodes reaches a predetermined level.

A further object is to connect the spaced electrodes and a hold-in sensitive relay in parallel with each other and in series with a fuse across a source of power, the fuse being responsive to a predetermined sum of the currents flowing between the electrodes plus the current flowing through the relay to open and de-energize the relay.

Further objects and advantages will appear when reading the following description in connection with the accompanying drawings.

IN THE DRAWINGS

FIG. 1 is a diagrammatic illustration of a typical hermetically sealed motor-compressor unit for air conditioning or heat pump service including a motor energizing circuit and incorporating contamination and high motor temperature sensing means and circuit breaking relays constructed in accordance with the invention;

FIG. 2 is a bottom plan view of the encapsulated fusible switch shown alone;

FIG. 3 is a longitudinal cross-sectional view of the fusible switch taken along lines 3—3 of FIG. 2;

FIG. 4 is an exterior elevational view of the contaminant sensor shown alone;

FIG. 5 is a longitudinal cross-sectional view of the contaminant sensor taken along lines 5—5 of FIG. 4;

FIG. 6 is a wiring diagram for accumulating and amplifying sensor signals;

FIG. 7 illustrates diagrammatically a second arrangement for the continued shut-down of operation of the motor-compressor unit in response to a predetermined degree of contamination of the refrigerant-oil mixture or in response to a predetermined high motor temperature;

DESCRIPTION OF A FIRST FORM OF THE INVENTION

Figure 9:
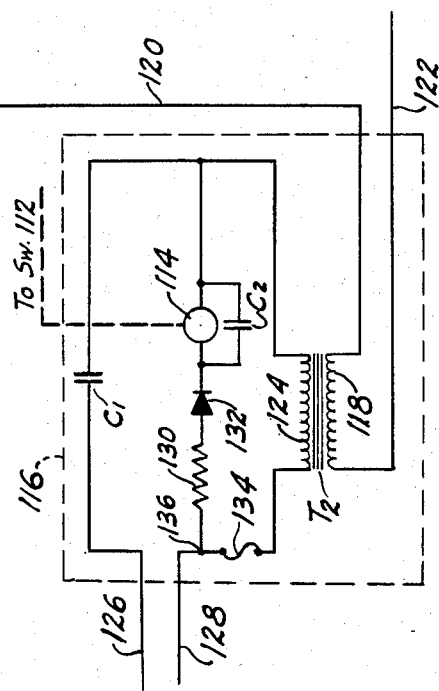
FIG. 9 is a wiring diagram showing the sensor and relay hold-in circuit employed in FIG. 8.

Referring to FIG. 1, a motor-compressor unit for air conditioning or heat pump service comprises a compressor 10 driven through a shaft 12 by a motor 14 positioned above the compressor. The unit is enclosed in a casing 16. Numeral 18 indicates a mixture of liquid refrigerant and lubricating oil which conventionally accumulates in the lower portion or sump of the casing which encloses the motor-compressor unit. The starting and running windings of motor 14 (not shown) are connected across A C power source terminals 20 through leads 22, 24, 26 and 28 and 30. There is a normally closed, relay operated switch 34 in the lead 22 and a normally closed, relay operated switch 36 in the lead 24.

Positioned in good heat transfer relationship with motor 14, as in its stator, is a normally open, encapsulated, fusible switch device 38 which is connected in parallel with the windings of motor 14 by leads 40 and 42. There is a relay 44 connected in lead 42 and which when energized opens the normally closed switch 36 to break the energizing circuit for the windings of motor 14. The fusible switch device 38, shown alone in FIGS. 2 and 3 comprises an open ended hollow cylindrical metal casing 46, arranged vertically and having an intermediate internal shoulder formed therein supporting a thick disc shaped member 48 constructed of an electrically conductive alloy and compounded to melt at a predetermined temperature. The upper and lower ends of casing 16 are sealed by glass discs 50 and 54 and a pair of vertically arranged and horizontally spaced electrodes or contacts 52 extend from the exterior through the glass wall 54 and into the lower portion of the casing.

The interiorly projecting end portions of electrodes 52 are spaced vertically below the alloy disc 48 and the exteriorly projecting end portions thereof are suitably connected to the circuit leads 40 and 42. The fusible switch 38 being mounted in a vertical position as shown, with the fusible alloy disc 48 above the horizontally spaced electrodes, closes an energizing circuit for relay 44 to effect the opening of switch 36 when alloy disc 48 melts and bridges the electrodes 52 below as a result of a predetermined high temperature attained by motor 14. It will be noted that in this arrangement there is no electrical power consumption until and unless fusible switch 38 closes in response to an overheated motor.

A contaminant sensor, generally indicated at 56 in FIG. 1, and shown in detail in FIGS. 4 and 5, is provided for sensing the degree of contamination of the refrigerant-lubricating oil mixture 18 which accumulates in the lower portion of casing 16. The sensor 56 comprises a pair of spaced electrodes 58 which extend through the casing wall and are positioned so as to be immersed in the mixture. The electrodes 58 are supported in a metal cup shaped member 60. The member 60 is fitted into an aperture in the wall of casing 16 and has its sidewall welded to the casing wall as shown at 62. The bottom of cup member 60 has two spaced apertures formed therein with interiorly extending surrounding sidewalls 64 through which electrodes 58 extend interiorly and exteriorly of the casing 16 and are sealed therein by glass as indicated at 66.

The exteriorly extending portions of electrodes 58 extend through spaced pedestals of a hard rubberlike disc member 68 bonded to the exterior surface of the bottom of cup member 60. The exteriorly extending ends of electrodes 58 are connected by suitable means to the leads 70 and 72 of a signal accumulating and amplifying network indicated at 74 and shown diagrammatically in FIG. 6 within the dotted line enclosure 74.

Referring to FIG. 6, a D C relay indicated at 82 when energized opens the normally closed switch 34 to break the energizing circuit for the windings of motor 14 and thereby shut down operation of the motor-compressor unit. Relay 82 is connected in series with and between a resistor $R_1$ and a silicon controlled rectifier $SCR_1$ across a relatively low D C power source through leads 84 and 86. The D C power source comprises a transformer $T_1$ having a secondary winding 88 both ends of which are connected to lead 84 through rectifying diodes $D_1$ and $D_2$, the return lead 86 being connected to the center of secondary winding 88. There is also a filtering capacitor $C_1$ connected across leads 84 and 86. Transformer $T_1$ also includes a primary winding 90 connected across the A C power supply by leads 92 and 94.

One of the immersed electrodes 58 of the contaminant sensor 56 is connected by the lead 70 to the lead 84 and the other of the electrodes 58 is connected by the lead 72 to the lead 86 through a capacitor $C_2$. A gating network for the $SCR_1$ comprises a unijunction transistor $Q_1$ (or double base diode) having one base $b_1$ connected to lead 84 through a resistor $R_2$ and its other base $b_2$ connected to lead 86 through a resistor $R_3$. The emitter $E_1$ of the transistor $Q_1$ is connected to the lead 72 between the capacitor $C_2$ and the other electrode 58. A lead 96 also connects the base $b_2$ of transistor $Q_1$ with the control electrode of $SCR_1$ and a capacitor $C_3$ is connected between lead 96 and lead 86.

The refrigerant-oil mixture is conventionally constantly circulated by a lubricating pump in motor-compressor units of this kind so that conductive or semiconductive contaminating particles may bridge the sensor electrodes 58 only momentarily. However, the capacitor $C_2$ is a low leakage capacitor and when contamination of the mixture attains a degree wherein conduction across electrodes 58 causes a voltage buildup on capacitor $C_2$ and consequently the emitter $E_1$ which is greater than the voltage applied to base $b_1$ through resistor $R_1$ the transistor $Q_1$ will be forward biased.

Transistor $Q_1$ will now conduct and capacitor $C_2$ will discharge therethrough and apply a strong gating pulse to $SCR_1$ via emitter $E_1$ across the PN junction to base $b_2$ and thence through lead 96 to the control electrode of $SCR_1$. The capacitor $C_3$ connected between lead 96 and lead 86 then acts to prolong the gating pulse to assure the turn on of $SCR_1$. Once the $SCR_1$ is turned on it continues to conduct and the D C relay 82 is continuously energized and normally closed switch 34 is opened thereby to continuously shut-down operation of the motor-compressor unit. The power source controlled by $SCR_1$ will remain conductive, D C relay 82 will remain energized and switch 34 will remain open thereby to effect a continued shut-down of the motor-compressor unit.

DESCRIPTION OF A SECOND FORM OF THE INVENTION

FIG. 7, diagrammatically illustrates a simplified and somewhat more economical arrangement for the continued shut-down of the motor-compressor unit when contamination of the refrigerant-oil mixture attains a predetermined degree. The means shown in FIG. 7 for shutting down operation of the motor-compressor unit in event of motor overheating is identical with the means employed in the arrangement shown in FIG. 1 and like parts are designated by like numerals throughout in FIG. 7.

In the arrangement shown in FIG. 7, for a continued shut-down of operation of the unit when contamination of the refrigerant-oil mixture reaches a predetermined degree, the immersed electrodes 58 of sensor 56 are directly connected to supply leads 22 and 30 by leads 96 and 98 respectively. A fusible link 100 is connected in supply lead 22 between the power source terminal and the junction of leads 96 and 22 and is compounded to melt when a predetermined electrical current is passed therethrough for a predetermined period of time thereby to break the circuit to the windings of motor 14 at that point. The predetermined electrical current passing through fuse 100 may consist of conduction through contaminants across the electrodes 58 plus the load of motor 14.

DESCRIPTION OF A THIRD FORM OF THE INVENTION

Figure 8:
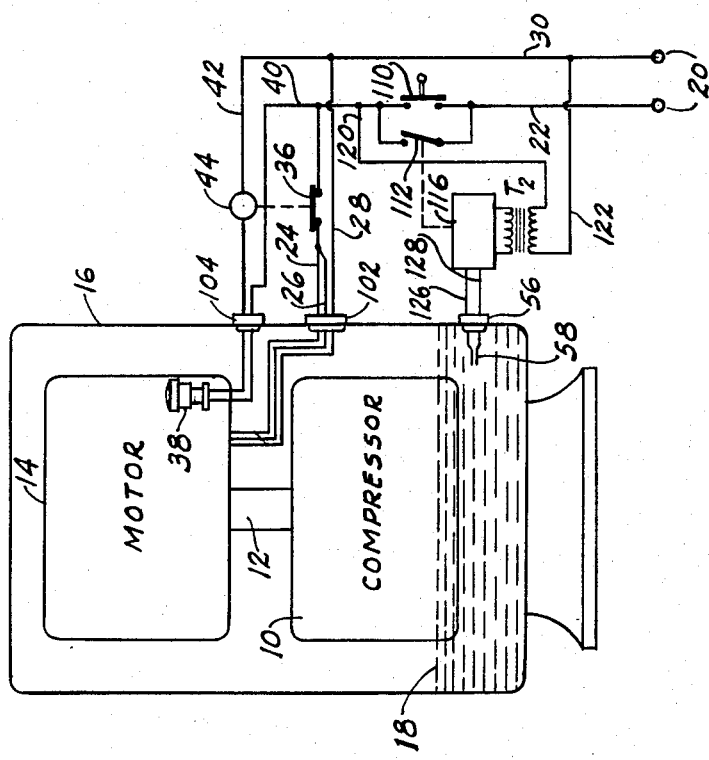
FIG. 8 illustrates diagrammatically a third arrangement for the continued shut-down of the motor-compressor unit in response to a predetermined degree of contamination of the refrigerant-oil mixture or in response to a predetermined high motor temperature.

FIGS. 8 and 9 diagrammatically illustrate a third arrangement for the continued shut-down of the motor-compressor unit in event of a predetermined degree of contamination of of the refrigerant-oil mixture or overheating of the motor. The means shown in FIG. 8 for shutting down the unit in event of motor overheating is identical with the means employed in the arrangements shown in FIGS. 1 and 7 and like parts of this means are designated by like numerals throughout in FIG. 8. Also, the contaminant sensor 56 employed in the arrangement of FIG. 8 may be similar to that employed in the arrangements of FIGS. 1 and 7.

Referring to FIGS. 8 and 9 in more detail, the starting and running windings of motor 14 are connected across A C power source terminals 20 through leads 22, 24, 26 and 28 and 30. There are two normally open switches 110 and 112 connected in parallel in lead 22. Switch 110 is a normally open 2-pole contactor switch which is intended to be held closed momentarily either manually or remotely through relay means. Switch 112 is a normally open switch operated to a closed position by a sensitive D C hold-in relay 114 when it is sufficiently energized, see FIG. 9. A circuit for applying a sufficient D C current through relay 114 and for applying an A C potential across sensor electrodes 58 is indicated at 116 in FIG. 8 and shown diagrammatically in FIG. 9.

Referring to FIGS. 8 and 9, a transformer $T_2$ has a primary winding 118 connected across the A C power supply leads 22 and 30 through switches 110 and 112 by leads 120 and 122. The ends of a secondary winding 124 of Transformer $T_2$ are connected to electrodes 58 of the sensor 56 through leads 126 and 128. The D C relay 114 is connected across the leads 126 and 128 in parallel with electrodes 58 through a voltage dropping resistor 130 and a rectifying diode 132. There is a capacitor $C_1$ in lead 126 for the purpose of reducing the inductive effect of the relay coil 114 and there is a capacitor $C_2$ connected across the relay 114 for the purpose of reducing the effect of noise spikes on the sensor 58 and for the purpose of extending the unidirectional current through relay 114. There is also a relatively low current sensitive fuse 134 in lead 128 connected between the secondary winding 124 and the junction 136 of the circuit connecting relay 114 across leads 128 and 126 so that energization of relay 114 is controlled by the fuse 134.

When push button switch 110 is closed momentarily the DC relay 114 is energized sufficiently through the fuse 134, resistor 130 and diode 132 to pull in switch 112 and thereafter relay 114 is energized at this level and a relatively high A C voltage is impressed across electrodes 58. When contamination of the refrigerant-oil mixture results in a contaminant track across the sensor electrodes 58 which allows sufficient charged ions or electrons to flow thereacross the resulting current flow thereacross adds to that flowing through the relay 114. When the sum of current flow across the sensor electrodes 58 plus that flowing through relay 114 exceeds a predetermined amount the current sensitive fuse 134 will open thereby de-energizing the relay and permitting the normally open switch 112 to open thereby shutting down operation of the motor-compressor unit. If push button switch 110 is again closed the unit will again operate but will shut down when the normally open push button switch is released.

In any of the arrangements illustrated in FIGS. 1, 7 or 8 the operation of the motor-compressor unit may be continuously shut down by either the occurrence of a predetermined high temperature of motor 14 or a predetermined degree of contamination of the refrigerant-oil mixture. On the other hand either the contaminant responsive means or the motor temperature responsive means shown in FIGS. 1, 7 or 8 may be employed alone to effect a continuous shut down of the motor-compressor unit.

The devices indicated at 102 and 104 for the sealed passage of leads 24, 26 and 28 to the motor windings and of leads 40 and 42 to fusible switch 38 through the wall of casing 16 may be of a construction similar to that shown in FIG. 5 for sealing the passage of electrodes 58 through the wall. It will be understood that double-break line switches (not shown) are included in leads 22 and 30 in all three of the arrangements described. The term "continued shut-down" as used herein means that shut down of the motor-compressor unit will continue until and unless fuses, when employed to effect the shut-down, are replaced or reset and/or the contaminated refrigerant-oil mixture is replaced when the cause of the shut-down.

We claim:

1. In a motor-compressor unit for air-conditioning or heat pump service enclosed in a casing which includes therein an accumulation of refrigerant-oil mixture, a source of electrical power, circuit connections connecting said motor of said unit across said power source, means for sensing contamination of said mixture caused by electrically conductive particles therein comprising a pair of spaced electrodes immersed in said mixture, means for applying a voltage gradient across said electrodes and means responsive to a predetermined electrical current flow across said electrodes to break said circuit connections and shut-down said motor, and a normally open fusible switch device positioned in good heat transfer relationship with said motor and responsive to fuse and close in responsive to a predetermined high motor temperature, a normally closed switch in said circuit connections, a relay which when energized opens said normally closed switch, and further circuit connections connecting said relay and said normally open fusible switch device in series with each other and in parallel with said motor across said power source whereby either a predetermined contamination of said mixture or a predetermined high motor temperature will result in a shut-down of said motor.

2. The motor-compressor unit and shut-down means therefor claimed in claim 1 in which said means responsive to a predetermined current flow across said electrodes to break said circuit connections and thereby shut-down said motor is continuous and irreversible by diminution of electrical current flow across said electrodes.

* * * * *